(12) United States Patent
Yi et al.

(10) Patent No.: US 10,878,086 B2
(45) Date of Patent: Dec. 29, 2020

(54) DYNAMIC CODE EXTRACTION-BASED AUTOMATIC ANTI ANALYSIS EVASION AND CODE LOGIC ANALYSIS APPARATUS

(71) Applicant: Foundation of Soongsil University-Industry Cooperation, Seoul (KR)

(72) Inventors: Jeong Hyun Yi, Seongnam-si (KR); Jongsu Lim, Seoul (KR); Sun Jun Lee, Seoul (KR); Yong Gu Shin, Seoul (KR); Kyu Ho Kim, Daejeon (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 99 days.

(21) Appl. No.: 16/198,781

(22) Filed: Nov. 22, 2018

(65) Prior Publication Data
US 2020/0089873 A1    Mar. 19, 2020

(30) Foreign Application Priority Data
Sep. 17, 2018 (KR) .......................... 10-2018-0110879

(51) Int. Cl.
*G06F 11/00* (2006.01)
*G06F 12/14* (2006.01)
(Continued)

(52) U.S. Cl.
CPC .............. *G06F 21/54* (2013.01); *G06F 8/433* (2013.01); *G06F 21/566* (2013.01); *G06F 2221/033* (2013.01)

(58) Field of Classification Search
CPC .... G06F 21/566; G06F 2221/033; G06F 8/53; G06F 21/562; G06F 21/54; G06F 21/14; G06F 8/433
See application file for complete search history.

(56) References Cited

U.S. PATENT DOCUMENTS

2007/0219915 A1*  9/2007  Hatano .................. H04L 9/083
                                                                705/57
2012/0272072 A1* 10/2012  Lee ....................... G06F 21/125
                                                                713/190

(Continued)

FOREIGN PATENT DOCUMENTS

KR           10-0942795 B1    2/2010
KR      10-2014-0114769 A     9/2014
(Continued)

*Primary Examiner* — Trong H Nguyen
(74) *Attorney, Agent, or Firm* — Revolution IP, PLLC

(57) ABSTRACT

A dynamic code extraction-based automatic anti-analysis evasion and code logic analysis apparatus, includes: a recognition module that extracts a DEX file and a SO file by unpacking an execution code of an application and recognizes an analysis avoidance technique by comparing a signature which is included in the extracted DEX file and SO file; a instrumentation module that extracts a code to be analyzed from a byte code configuring the DEX file and a native code configuring the SO file, compares the extracted code with the data stored in a database, and outputs a code excluding an anti-analysis technique as a log file; and a deobfuscation module that deobfuscates an obfuscated code which is included in the APK on the basis of the output log file and generates an APK file in which an obfuscation technique is released on the basis of the deobfuscated code.

11 Claims, 8 Drawing Sheets

(51) Int. Cl.
*G06F 12/16* (2006.01)
*G08B 23/00* (2006.01)
*G06F 21/54* (2013.01)
*G06F 8/41* (2018.01)
*G06F 21/56* (2013.01)

(56) References Cited

U.S. PATENT DOCUMENTS

| | | | |
|---|---|---|---|
| 2015/0033342 A1* | 1/2015 | Zhang | G06F 21/563 |
| | | | 726/23 |
| 2016/0321453 A1* | 11/2016 | Yang | G06F 21/566 |
| 2017/0169224 A1* | 6/2017 | Park | G06F 21/566 |
| 2017/0262656 A1* | 9/2017 | Salmon-Legagneur | |
| | | | G06F 11/1004 |
| 2017/0337372 A1* | 11/2017 | Zhang | G06F 21/566 |
| 2018/0307837 A1* | 10/2018 | Ahn | G06F 21/14 |
| 2019/0243974 A1* | 8/2019 | Chen | G06F 21/566 |

FOREIGN PATENT DOCUMENTS

| KR | 10-1602881 B1 | 3/2016 |
|---|---|---|
| KR | 10-1724412 B1 | 4/2017 |
| KR | 10-2017-0055933 A | 5/2017 |
| KR | 10-2017-0068814 A | 6/2017 |
| KR | 10-2017-0087887 A | 7/2017 |
| KR | 10-2017-0089859 A | 8/2017 |
| KR | 10-2017-0096451 A | 8/2017 |
| WO | 2015/047804 A1 | 4/2015 |

* cited by examiner

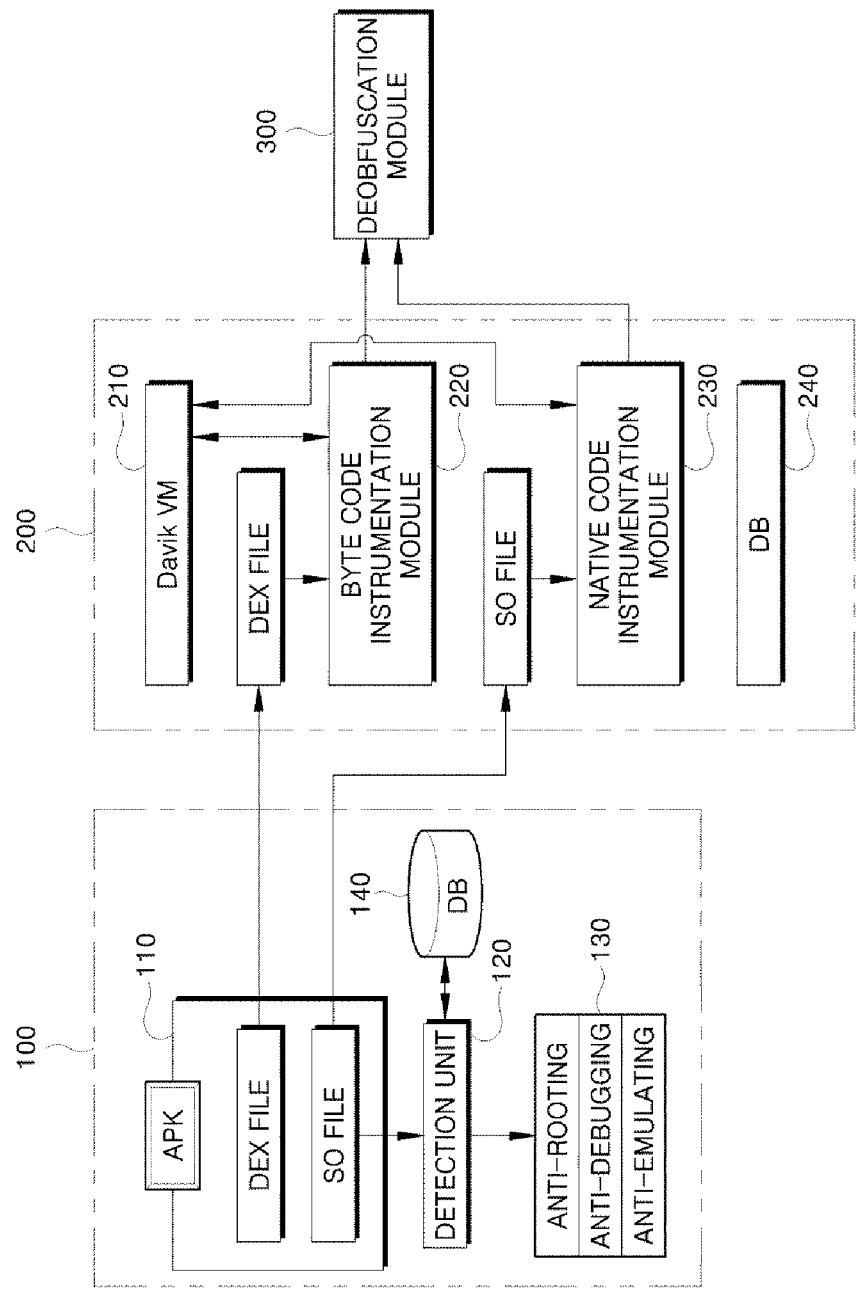
[FIG. 1]

[FIG. 2]
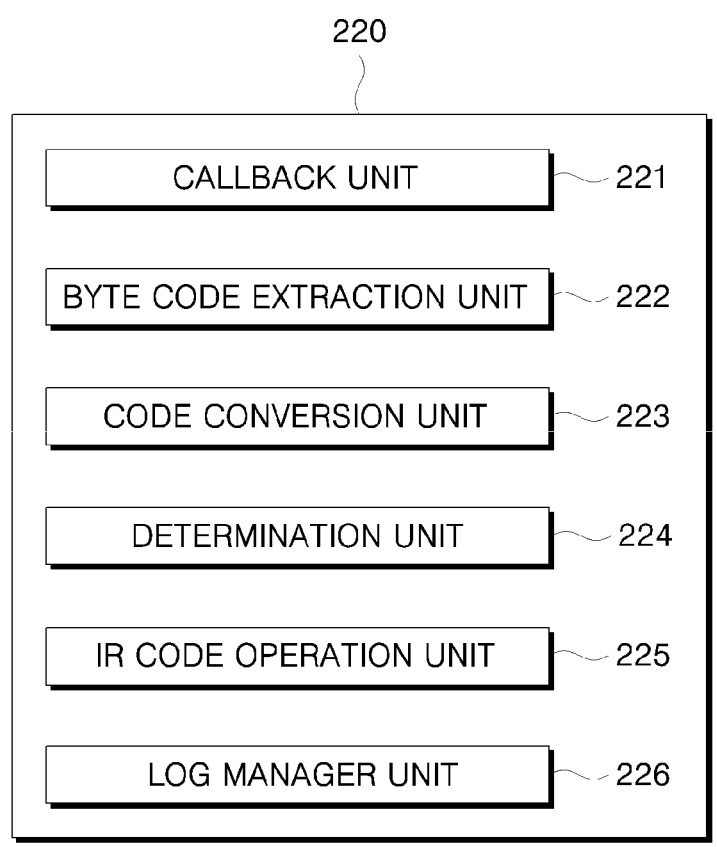

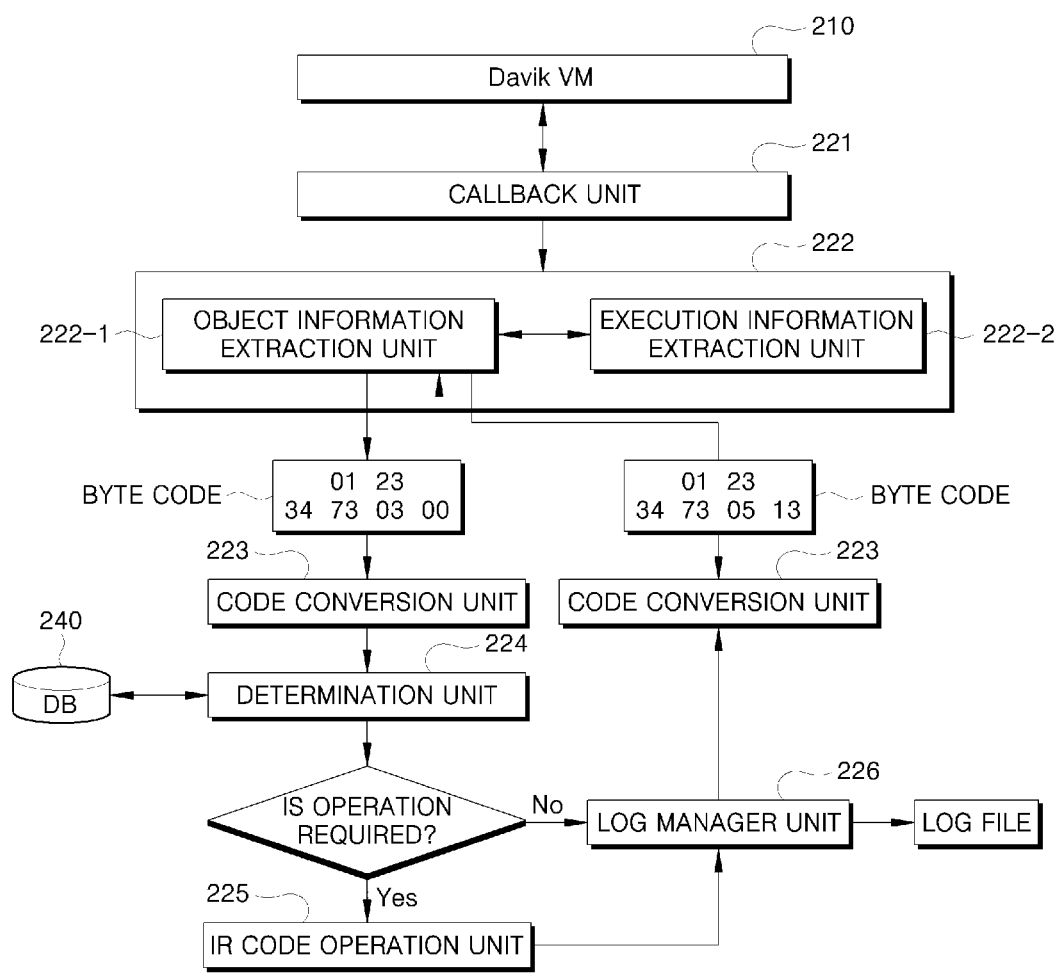
[FIG. 3]

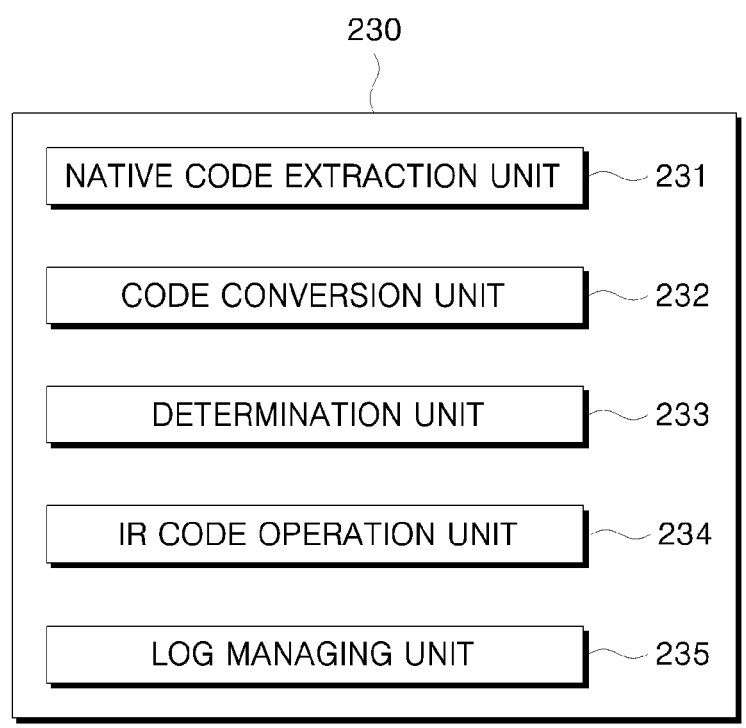
[FIG. 4]

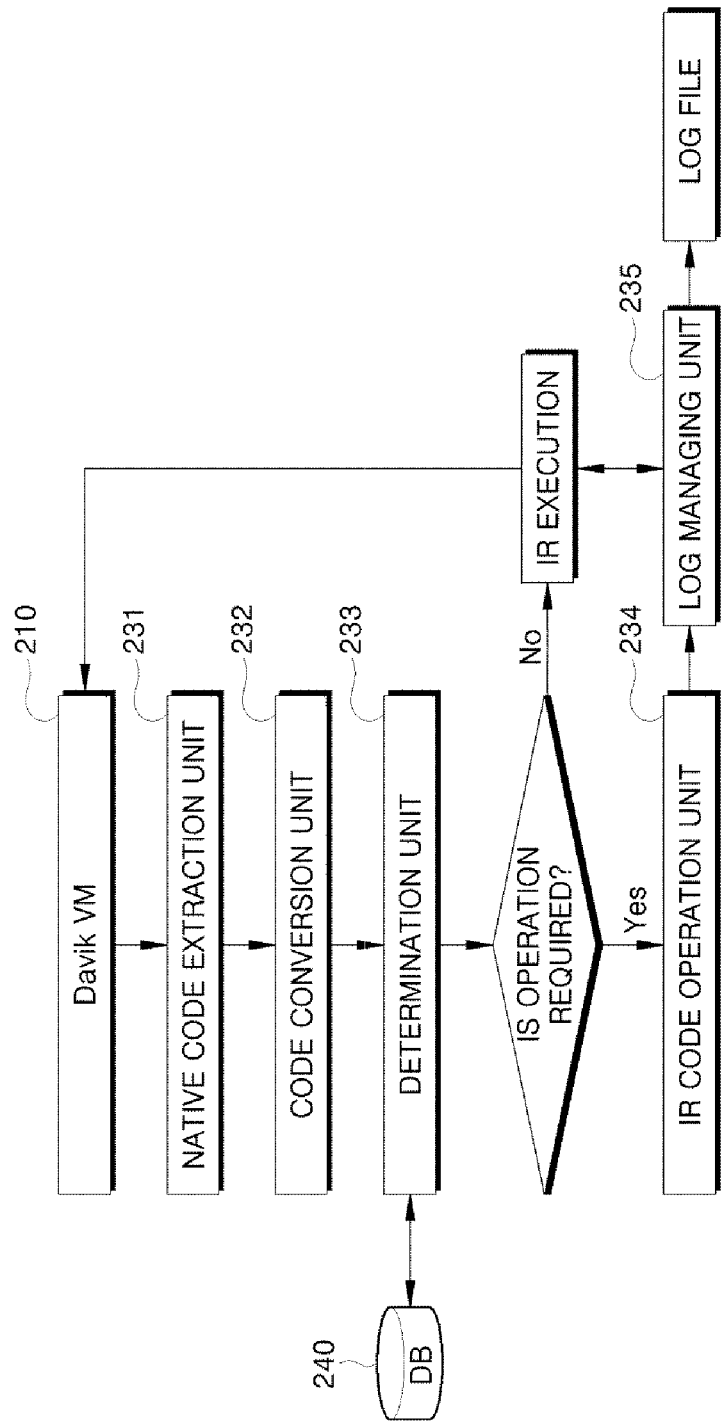
[FIG. 5]

[FIG. 6]
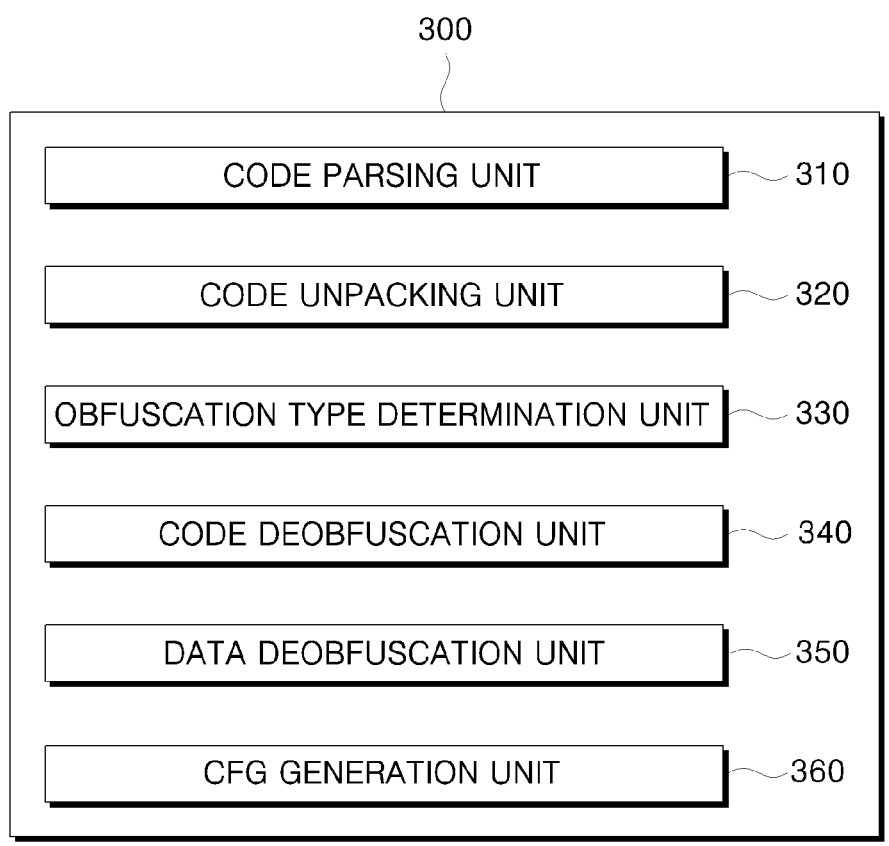

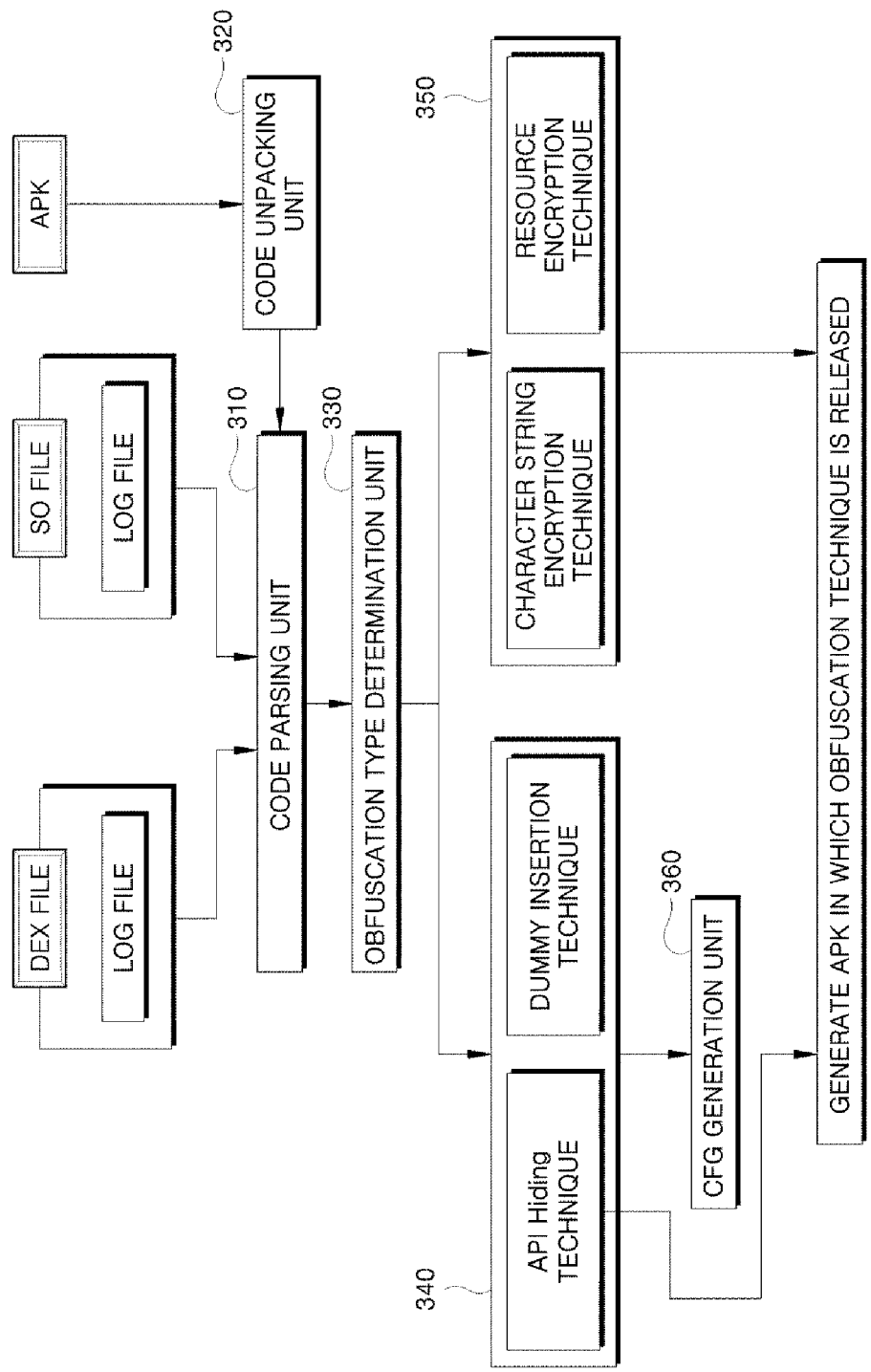

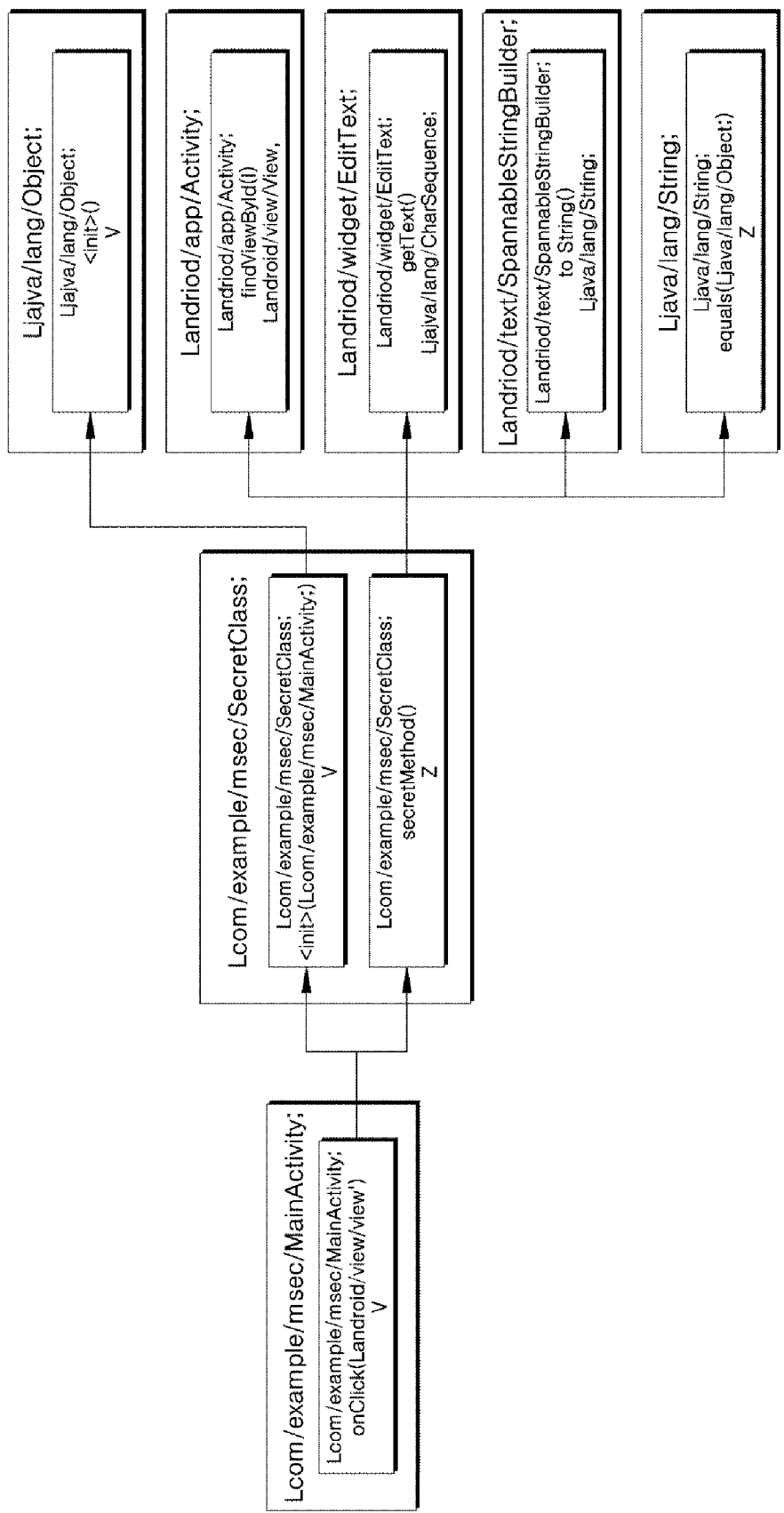
[FIG. 8]

DYNAMIC CODE EXTRACTION-BASED AUTOMATIC ANTI ANALYSIS EVASION AND CODE LOGIC ANALYSIS APPARATUS

CROSS-REFERENCE TO RELATED APPLICATION

This application claims priority to and the benefit of Korean Patent Application No. 10-2018-0110879 filed in the Korean Intellectual Property Office on Sep. 17, 2018, the entire contents of which are incorporated herein by reference.

BACKGROUND OF THE INVENTION

(a) Field of the Invention

The present invention relates to a dynamic code extraction-based automatic anti-analysis evasion and code logic analysis apparatus, and more particularly, to a dynamic code extraction-based automatic anti-analysis evasion and code logic analysis apparatus that recovers an application to a status before application by evading an anti-analysis technique that is applied to make the application difficult to analyze.

(b) Description of the Related Art

As a market for Android applications grows, the number of malicious applications is also rapidly increasing, and the malicious application has to be analyzed by using various analysis methods in order to cope with the increase of the malicious applications. However, an anti-analysis technique is applied to a recently developed malicious application, and thus, there is a problem that the recently developed malicious application is hard to be analyzed through the existing analysis system.

Therefore, in order to analyze the malicious application described above, a framework for evading and analyzing the applied anti-analysis technique is required.

The analysis framework has various methods according to a CPU and a language to be used, and the methods require a lot of time and efforts because codes of a virtual machine or a kernel level have to be directly modified.

In addition, a current anti-analysis technique has problems in which evasion of the anti-analysis technique is manually made by an expert thereby being able to be greatly influenced by an analytical ability of the expert and takes a lot of time and efforts because of being processed manually, and a limitation occur before the work is completed.

Meanwhile, there are a variety of analysis frameworks for PCs, and a widely used CPU-based analysis framework includes a Pin tool and DynamoRio.

However, the analysis framework can be efficiently used for analysis in a PC environment, but there is a problem that it is necessary to be redeveloped through porting or a virtual machine has to be modified so as to analyze the malicious application of Android, and there is a limitation that cannot be used for analysis in the ART environment.

A technology of the background of the present invention is disclosed in Korean Patent Publication No. 10-2017-0055933 (issued on May 22, 2017).

SUMMARY OF THE INVENTION

An object of the present invention is to provide a dynamic code extraction-based automatic anti-analysis evasion and code logic analysis apparatus that recovers an application to a status before application by evading an anti-analysis technique applied to analyze the application.

According to one embodiment of the present invention, a dynamic code extraction-based automatic anti-analysis evasion and code logic analysis apparatus based on a dynamic code of an application includes a recognition module that extracts a DEX file and a SO file by unpacking an execution code of an application which is compressed in an APK form and recognizes an analysis avoidance technique by comparing a signature which is included in the extracted DEX file and SO file with data which is previously stored in a database; an instrumentation module that extracts a code to be analyzed from a byte code configuring the DEX file and a native code configuring the SO file, compares the extracted code with the data stored in a database, and outputs a code excluding an anti-analysis technique as a log file; and a deobfuscation module that deobfuscates an obfuscated code which is included in the APK on the basis of the output log file and generates an APK file in which an obfuscation technique is released on the basis of the deobfuscated code.

The recognition module may recognize the anti-analysis technique to which at least one of an anti-rooting technique, an anti-debugging technique, and an anti-emulating technique is applied and may construct the anti-analysis technique which is recognized through the recognition module in the database.

The instrumentation module may include a byte code instrumentation module that extracts object information and execution information from the DEX file, compares a byte code which is generated by combining the extracted object information and execution information with the database, and operates a corresponding code if the anti-analysis technique is used; and a native code instrumentation module that extracts an analysis target code from the SO file, compares the extracted analysis target code with the database, and operates a corresponding code if the anti-analysis technique is used.

The byte code instrumentation module may include a byte code extraction unit that extracts a byte code by combining the object information and the execution information which is extracted from the DEX file when an event occurs; a code conversion unit that converts the extracted byte code into an IR code or converts the converted IR code into a byte code; an anti-analysis technique determination unit that compares the converted IR code with the data which is stored in the database and determines whether or not the anti-analysis technique is applied; an IR code operation unit that removes the anti-analysis technique by operating a corresponding code if the anti-analysis technique is applied to the IR code; and a log managing unit that outputs the code which does not have the anti-analysis technique as a log file.

The native code instrumentation module may include a native code extraction unit that extracts a native code from the SO file when an event occurs; a code conversion unit that converts the native code into an IR code; an anti-analysis technique determination unit that compares the converted IR code with the data which is stored in the database and determines whether or not the anti-analysis technique is applied; an IR code operation unit that removes the anti-analysis technique by operating a corresponding code if the anti-analysis technique is applied to the converted IR code; and a log managing unit that outputs the code which does not have the anti-analysis technique as a log file.

The native code extraction unit may specify a native function to be executed by the application and may selectively extract only a function which a user creates from the specified native function.

The deobfuscation module may release an obfuscation technique which is applied to the APK that is input on the basis of information of the log file and may generate an APK file in which a code obfuscation technique or a data obfuscation technique is deobfuscated.

The deobfuscation module may include a code deobfuscation module that deobfuscates a method of obfuscating a progress flow of a code; and a data deobfuscation module that deobfuscates a part corresponding to data.

The code deobfuscation module may evade an API Hiding technique that hides a calling process of a function and a dummy code insertion technique that transforms a calling structure by inserting a meaningless dummy code that is not actually related to an operation.

The data deobfuscation module may release a character string encryption technique that encodes a character string which is given to a code and interferes with analysis of a function and an object which are associated with a corresponding character string, and a resource encryption technique that interferes with analysis of a pictures and a resource of xml.

The code deobfuscation module may make a diagram of an execution flow flowchart of functions that are given from an APK which is deobfuscated or an APK which is not deobfuscated and provides the diagram to the control flow graph (CFG).

As such, according to the present invention, the automatic anti-analysis evasion and code logic analysis apparatus is specialized in the Android analysis, and thereby, a detailed analysis can be performed in all environments of the Dalvik virtual machine and the ART, and a user can directly create a plug-in to graft the plug-in into a device. Accordingly, the automatic anti-analysis evasion and code logic analysis apparatus has an effect that the user can easily add a necessary analysis function.

In addition, according to the present invention, a device is provided which allows the user to easily and efficiently analyze a malicious application through a visual output such as a control flow graph (CFG) in the Android environment, and thereby, it is possible to obtain an effect that an effort and time taken to an analysis can be reduced.

In addition, according to the present invention, there is an effect that a flow of an analysis target code can be extracted by using an analysis framework and a plug-in thereof, and thereby, a decryption routine of the obfuscated application can be verified and the anti-analysis technique can be evaded.

In addition, according to the present invention, there is an effect that the automatic anti-analysis evasion and code logic analysis apparatus is developed in a plug-in format in the Android operating system itself and can quickly cope with malicious codes targeting a new version of Android.

In addition, according to the present invention, there is an effect that the present invention also includes a native code and can analyze all codes executed by the Android whereas the existing Android analysis framework only aims at a byte code.

BRIEF DESCRIPTION OF THE DRAWINGS

FIG. 1 is a configuration diagram illustrating a dynamic code extraction-based automatic anti-analysis evasion and code logic analysis apparatus according to an embodiment of the present invention.

FIG. 2 is a diagram illustrating a configuration of a byte code instrumentation module among instrumentation modules illustrated in FIG. 1.

FIG. 3 is a flowchart illustrating a log file generation process performed by the byte code instrumentation module illustrating in FIG. 2.

FIG. 4 is a diagram illustrating a configuration of a native code instrumentation module among the instrumentation modules illustrated in FIG. 1.

FIG. 5 is a flowchart illustrating a process of generating a log file performed by the native code instrumentation module illustrated in FIG. 4.

FIG. 6 is a diagram illustrating a configuration of a deobfuscation module illustrating in FIG. 1.

FIG. 7 is a flowchart illustrating an APK generation process in which an obfuscation technique performed by the deobfuscation module is released illustrated in FIG. 6.

FIG. 8 is a diagram schematically illustrating a CFG file generated by a CFG generation module illustrated in FIG. 6.

DETAILED DESCRIPTION OF THE EMBODIMENTS

Hereinafter, preferred embodiments of the present invention will be described in detail with reference to the accompanying drawings. In this process, thicknesses of lines, sizes of the components, and the like illustrated in the drawings may be exaggerated for the sake of clarity and convenience of description.

In addition, terms which will be described below are defined in consideration of functions of the present invention, which may change depending on intention or custom of a user or an operator. Therefore, a definition of the terms will have to be based on the content throughout the present specification.

First, an automatic anti-analysis evasion and code logic analysis apparatus according to an embodiment of the present invention will be described with reference to FIG. 1.

FIG. 1 is a configuration diagram illustrating an automatic anti-analysis evasion and code logic analysis apparatus according to an embodiment of the present invention; FIG.

As illustrated in FIG. 1, the automatic anti-analysis evasion and code logic analysis apparatus according to the embodiment of the present invention recovers an application to a status before application by evading an anti-analysis technique applied for analyzing a malicious application, and includes a recognition module 100, an instrumentation module 200, and a deobfuscation module 300.

The recognition module 100 extracts a DEX file and a SO file, which are execution codes included in an application, compares signatures included in the extracted DEX file and SO file with data stored in a database, and recognizes whether or not the analysis avoidance technique is applied.

More specifically, the recognition module 100 includes an extraction unit 110, a detection unit 120, and a determination unit 130 so as to analyze whether or not the analysis avoidance technique is applied to a PC before the Android application is executed.

The extraction unit 110 unpacks an executable code of the application extruded in an APK form to extract the DEX file and the SO file, and parses the extracted DEX file and SO file to acquire a character string signature, an API signature, and a binary signature.

At this time, the extraction unit obtains the character string signature from the DEX file, and obtains the character string signature, the API signature, and the binary signature from the SO file.

As described above, if one or more signatures are obtained from the DEX file and the SO file, the detection unit 120 compares the acquired one or more signatures with the data stored in the database 140, and transmits the comparison result to the determination unit 130.

Meanwhile, the detection unit 120 detects information on the analysis avoidance technique applied to the DEX file and the SO file, and transmits the information on the detected analysis avoidance technique to the database 140. The database 140 that receives the information on the analysis avoidance technique adds additional information to the previously stored information and stores the information.

The database 140 in which new information is additionally stored shares the stored data with a database 240 of the instrumentation module 200 which will be described below.

The determination unit 130 receives the signature detected by the detection unit 120, converts the received signature into a form which can be recognized by a user, and outputs the converted signature.

Meanwhile, the recognition module 100 can recognize whether or not an anti-rooting technique, an anti-debugging technique, and an anti-emulating technique are applied by using the signatures included in the DEX file and the SO file.

Accordingly, the determination unit 130 determines a type of the analysis avoidance technique applied to an application file and information on a tool through the string signature, the API function signature, and the binary signature which are detected, converts the determination result into a form that can be recognized by a user, and outputs the converted result.

At this time, the type of the analysis avoidance technique includes the anti-rooting technique, the anti-debugging technique, and the anti-emulating technique, and a method of the analysis avoidance technique includes a character string method, an API method, and a binary method, and a tool applied to the analysis avoidance technique indicates a program used at the time of generation of an application.

The instrumentation module 200 evades the analysis avoidance technique included in the Android application in a mobile environment and includes a Dalvik virtual machine 210, a byte code instrumentation module 220, a native code instrumentation module 230, and a database 240.

The Dalvik virtual machine 210 is a virtual machine used when executing an application.

If an execution command is generated by the Dalvik virtual machine 210, the byte code instrumentation module 220 and the native code instrumentation module 230 receives code information of the DEX file and code information of the SO file which are loaded in the Dalvik virtual machine 210 so as to determine whether or not the analysis avoidance technique is previously applied to the application.

Hereinafter, the byte code instrumentation module included in the instrumentation module according to the embodiment of the present invention will be described in more detail with reference to FIG. 2 and FIG. 3.

FIG. 2 is a diagram illustrating a configuration of the byte code instrumentation module of the instrumentation module illustrated in FIG. 1.

As illustrated in FIG. 2, the byte code instrumentation module 220 includes a callback unit 221, a byte code extraction unit 222, a code conversion unit 223, a determination unit 224, an IR code operation unit 225, and a log managing unit 226.

The callback unit 221 detects an event generated by the Dalvik virtual machine 210 and transmits a signal to the byte code extraction unit 222 such that necessary information can be determined from the detected events.

The byte code extraction unit 222 extracts object information and execution information from the DEX file code information loaded in the Dalvik virtual machine 210 in order to secure the information requested in the event, combines the object information and the execution information which are extracted, and extracts the byte code.

The byte code is a code that can be understood by the Dalvik virtual machine 210, and the byte code is converted into an IR code which is an intermediate code such that a user can interpret the byte code. Therefore, the code conversion unit 223 converts the above-described byte code into the IR code or converts the IR code into the byte code.

The determination unit 224 compares the converted IR code with the data stored in the database 240 through the code conversion unit 223 and determines whether or not the anti-analysis technique is applied to the IR code.

If it is determined that the anti-analysis technique is applied to the IR code, the IR code operation unit 225 operates a corresponding code to remove the anti-analysis technique so as to evading the IR code. That is, the IR code operation unit changes a code execution sequence or converts a part of an object into an object that is not related to the anti-analysis technique.

The log managing unit 226 generates a log file from a code without the anti-analysis technique and outputs the generated log file. The code without the anti-analysis technique indicates a code which originally does not include the anti-analysis technique, or a code in which the anti-analysis technique is removed through the IR code operation unit 225.

As described above, the log file generated through the log managing unit 226 is transmitted to the deobfuscation module 300 which will be described later, is deobfuscated, and thereby, the APK file prior to applying the analysis avoidance technique is generated.

As described above, the byte code instrumentation module 220 extracts the byte code from the DEX file, determines the analysis avoidance technique applied to the extracted byte code, and generates the log file that can evade the analysis avoidance technique. This will be described in detail with reference to FIG. 3.

FIG. 3 is a flowchart illustrating a log file generation process performed by the byte code instrumentation module illustrated in FIG. 2.

As illustrated in FIG. 3, first, the callback unit 221 detects an event generated from the Dalvik virtual machine 210, and transmits the detected signal to the byte code extraction unit 222.

The byte code extraction unit 222 includes an object information extraction unit 222-1 and an execution information extraction unit 222-2.

The object information extraction unit 222-1 is a configuration element derived from the DEX file, extracts information on an object managed by runtime, and generates a data code by combining the extracted object information and the execution information on an object flow received from the execution information extraction unit 222-2. The generated data code is transmitted to the code conversion unit 223.

At this time, the object extracted by the object information extraction unit 222-1 includes a class, a method, a field, an instruction, and an object. The execution information extraction unit 222-2 manages information on a flow in which the object is used, extracts the execution information as needed, and transmits the extracted execution information to the object information extraction unit 222-1.

The byte code generated as described above is formed in a machine language, for example, "01 23 34 73 03 00", and is converted into an intermediate code so as to improve readability of a user.

Therefore, the code conversion unit 223 converts the byte code transmitted from the object information extraction unit 222-1 into an IR code, and the converted IR code is transmitted to the determination unit 224.

The determination unit 224 compares the received IR code with the data stored in the database 240 and determines whether or not the analysis avoidance technique is applied to the IR code.

At this time, if the determination unit 224 determines that the analysis avoidance technique is applied to the IR code, the IR code is transmitted to the IR code operation unit 225, and if the determination unit 224 determines that the analysis avoidance scheme is not applied to the IR code, the IR code is transmitted to the log managing unit 226.

As described above, the IR code operation unit 225, which receives the IR code by determining that the analysis avoidance technique is applied to the IR code, operates a corresponding code included in the received IR code. This operation changes an execution sequence of the code or converts the code into a meaningless code independent of the anti-analysis technique.

The operated IR code is transmitted to the log managing unit 226, and the log managing unit 226 which receives the operated IR code generates a log file.

Meanwhile, the log managing unit 226 transmits the IR code to which the IR code operated by the IR code operation unit 225 or the IR code to which the analysis avoidance technique is not applied to the code conversion unit 223, and the code conversion unit 223 that receives the IR code converts the IR code into a data code. For example, the code conversion unit 223 which receives the IR codes "move v3, v2, if-It v3, v7, loc_46" converts the IR code into byte codes "01 23 34 73 05 13", the byte codes are transmitted to the APK execution unit through the callback unit 221, and the application to which the changed execution code is applied is executed.

As described above, the byte code instrumentation module 220 instruments the analysis avoidance technique to the byte code extracted through the byte code extraction unit 222, and generates a code that can evade the analysis avoidance technique by operating the corresponding code. For example, the byte code instrumentation module 220 determines the analysis avoidance technique by using the data code "01 23 34 73 03 00" extracted through the byte code extraction unit 222, generates "01 23 34 73 05 13" by operating the corresponding code "03 00", thereby, evading the analytical avoidance technique.

Hereinafter, a native code instrumentation module included in the instrumentation module according to the embodiment of the present invention will be described in more detail with reference to FIGS. 4 and 5.

FIG. 4 is a diagram illustrating a configuration of the native code instrumentation module among the instrumentation modules illustrated in FIG. 1.

As illustrated in FIG. 4, the native code instrumentation module 230 includes a native code extraction unit 231, a code conversion unit 232, a determination unit 233, an IR code operation unit 234, and a log managing unit 235.

The native code extraction unit 231 receives information on the SO file related to a native execution from the Dalvik virtual machine 210. The native code extraction unit 231 that receives the information on the SO file specifies a native function that the application intends to execute. Again, the SO file includes a system code and a function that a user creates, and the function created by the user may include a malicious code. Therefore, the native code extraction unit 231 extracts a function created by the user, that is, a native code which is an analysis target code.

The native code extracted through the native code extraction unit 231 is transmitted to the code conversion unit 232. The code conversion unit 232 which receives the native code converts the native code into an IR code.

The determination unit 233 compares the converted IR code with the data stored in the database 240 and determines whether or not the analysis avoidance technique is applied to the IR code.

If the determination unit 233 determines that the analysis avoidance technique is applied to the received IR code, the IR code is transmitted to the IR code operation unit 234, and if the determination unit 233 determines that the analysis avoidance technique is not applied to the IR code, the IR code is transmitted to the log managing unit 235.

If it is determined that the anti-analysis technique is applied to the IR code, the IR code operation unit 234 removes the anti-analysis technique by operating the corresponding code so as to evade the IR code. That is, the IR code operation unit 234 changes a code execution sequence or modifies an input value or a return value of the function, thereby, invalidating the anti-analysis technique.

The log managing unit 235 generates a log file from a code that does not include the anti-analysis technique and outputs the generated log file. The code without the anti-analysis technique indicates a code that does not include originally the anti-analysis technique or a code in which the anti-analysis technique is removed through the IR code operation unit 234.

As described above, the log file generated through the log managing unit 235 is transmitted to the deobfuscation module 300 which will be described below, is deobfuscated, and thereby, the APK file prior to applying the analysis avoidance method is generated.

As described above, the native code instrumentation module 230 extracts the native code from the SO file, determines the analysis avoidance technique within the extracted native code, and generates a log file that can evade the analysis avoidance technique. This will be described in detail with reference to FIG. 5.

FIG. 5 is a flowchart illustrating a log file generation process performed by the native code instrumentation module illustrated in FIG. 4.

As illustrated in FIG. 5, if an execution command is generated in the Dalvik virtual machine 210, a Java native interface handler (not illustrated) included in the native code instrumentation module 230 receives information, which is included in the SO file, on a code to be executed from the Dalvik virtual machine 210.

The native code instrumentation module 230 that receives the information on the SO file and the code to be executed parses and manages the SO file and transmits the result generated at the end of the function to the Dalvik virtual machine 210 again.

The native code extraction unit 231 receiving the information on the SO file as described above specifies a native function that an application intends to execute by using the SO file. More specifically, first, the native code extraction unit 231 receives a native address and determines whether or not the received native address includes an external function. If the external function is included, the native code is not extracted, and if the external function is not included, a code cache is assigned to the native address. A program that a user generates is copied to the assigned code cache, and the native code is extracted by dividing the program in the code cache into command units.

As described above, the native code extraction unit 231 determines whether or not the program is a program that the user generates, and if the program is a program that the user generates, the native code is extracted. If the code received by the native code extraction unit 231 is a system code other than the program generated by the user, the native code is executed without being extracted, and the execution result is transmitted to the Dalvik virtual machine 210.

After the native code extraction unit 231 completes extraction of the native code, the native code is transmitted to the code conversion unit 232, and the code conversion unit 232 receiving the native code converts the native code into the IR code Then, the determination unit 233 compares the converted IR code with the data stored in the database 240, transmits the IR code to the IR code operation unit 234 if it is determined that an operation is required, and transmits the IR code to the log managing unit 235 if it is determined that the operation is not required.

At this time, an operation of the IR code is performed if the IR code and the data stored in the database 240 coincide with each other and it is determined that the analysis avoidance is applied.

Therefore, the IR code operation unit 234 changes an execution sequence of some codes included in the received IR code, or converts the some codes into meaningless codes independent of the anti-analysis technique.

After the operation of the code is completed, the IR code operation unit 234 transmits the operated IR code to the log managing unit 235.

The log managing unit 235, which receives the operated IR code or the IR code that does not require the operation, generates a log file.

In addition, the log managing unit 235 generates the log file and executes the IR code. If the execution is completed, the end result is transmitted to the Dalvik virtual machine 210.

As described above, each log file generated through the byte code instrumentation module 220 and the native code instrumentation module 230 is transmitted to the deobfuscation module 300.

The deobfuscation module 300 is included in an external PC, receives the log file generated from the DEX file and the log file generated from the SO file, receives a target APK used when generating the log file, and deobfuscates the target APK by using the information included in the log file.

Hereinafter, the deobfuscation module according to the embodiment of the present invention will be described in more detail with reference to FIGS. 6 to 8.

FIG. 6 is a diagram illustrating a configuration of the deobfuscation module illustrated in FIG. 1, FIG. 7 is a flowchart illustrating a process of generating the APK in which an obfuscation performed by the deobfuscation module illustrated in FIG. 6 is released, and FIG. 8 is a diagram schematically illustrating a CFG file generated by a CFG generation module illustrated in FIG. 6.

As illustrated in FIG. 6, the deobfuscation module 300 includes a code parsing unit 310, a code unpacking unit 320, an obfuscation type determination unit 330, a code deobfuscation unit 340, a data deobfuscation unit 350, and a CFG generation unit 360.

The code parsing unit 310 receives a log file transmitted from the byte code instrumentation module 220 and the native code instrumentation module 230 and an APK file, which is transmitted from the code unpacking unit 320, in which unpack the code. The code parsing unit 310 manages the received log file and the APK file in which the unpacked and parses the IR code and the APK internal code which are included in the log file so as to change to a form that is convenient for a deobfuscation.

If the received APK is in an packed state, the code unpacking unit 320 unpack of the APK and transmits the APK to the code parsing unit 310.

The obfuscation type determination unit 330 grasps which obfuscation method is applied to a target APK on the basis of the received log file. Since a deobfuscation method includes a code obfuscation method and a data obfuscation method, the obfuscation type determination unit 330 determines which obfuscation method is applied to the APK among the code obfuscation method and the data obfuscation method.

If it is determined that the obfuscation technique applied to the APK is a code obfuscation technique on the basis of the received log file, the obfuscation type determination unit 330 transmits information on the log file to the code deobfuscation unit 340 so as to perform a deobfuscation, and if it is determined that the obfuscation technique applied to the APK is a data obfuscation technique on the basis of the log file, the obfuscation type determination unit 330 transmits the information on the log file to the data deobfuscation unit 350 so as to perform a deobfuscation.

The code deobfuscation unit 340 deobfuscates a method of obfuscating a progress flow of the code included in the APK through the information on the received log file, and the data deobfuscation unit 350 deobfuscates a part corresponding to data included in the APK.

At this time, the code deobfuscation unit 340 transmits the deobfuscated APK and the APK which is not yet deobfuscated to the CFG generation unit 360, and the CFG generation unit 360 receives the deobfuscated APK and makes a diagram of an execution flow chart of the APK.

The deobfuscation module 300 determines the obfuscation technique applied to the target APK by using the received IR code, deobfuscates the determined obfuscation technique, and generate an APK file in which the obfuscation technique is released. This will be described in more detail with reference to FIG. 7.

As illustrated in FIG. 7, first, the byte code instrumentation module 220 generates a log file including an IR code in which an analysis avoidance technique is evaded from the DEX file and transmits the generated log file to the deobfuscation module 300. In addition, the native code instrumentation module 230 generates a log file including an IR code in which an analysis avoidance technique is evaded from the SO file and transmits the generated log file to the deobfuscation module 300.

Thus, the deobfuscation module 300 receives the log file from the instrumentation module 200. The received log file includes the IR code and grasps the obfuscation technique applied to the APK by using the included IR code.

First, the code parsing unit 310 receives the log files generated by the byte code instrumentation module 220 and the native code instrumentation module 230, and the APK in which unpacked by the code unpacking unit 320 and parses the received log files and APK in which unpacked such that a deobfuscation is convenient.

At this time, the code unpacking unit 320 determines whether or not the input APK is packed and unpack technique applied to the APK in accordance with the determination result. The APK in which unpacked is transmitted to the code parsing unit 310 as described above.

As described above, the code parsing unit 310, which parses the log file and the APK in which unpacked, transmits IR information and APK data to the obfuscation type determination module 330.

The obfuscation type determination module 330 receiving the IR code determines an obfuscation technique applied to the APK on the basis of the IR code. At this time, if it is determined that the code obfuscation is applied to the APK, the obfuscation type determination module 330 transmits the APK to the code deobfuscation module 340 so as to release the code obfuscation, and if it is determined that the data obfuscation is applied to the APK, the obfuscation type determination module 330 transmits the APK to the data deobfuscation module 350 so as to release the data obfuscation.

First, the code deobfuscation module 340 deobfuscates methods of obfuscating a progress flow of the code among the kinds of obfuscation techniques and evades an API reverse hiding technique for concealing a calling process of a function and a dummy code insertion technique for transforming a call structure by inserting a meaningless dummy code actually unrelated to an operation.

Accordingly, the code deobfuscation module 340 decrypts the APK using the API hiding technique and the dummy code insertion technique to generate the deobfuscated APK execution file.

At this time, the code deobfuscation module 340 provides the APK execution file in which obfuscation is released to the CFG generation module 360.

The CFG generation module 360 converts a flow of the given functions into a tree structure to generate a graph as illustrated in FIG. 8.

Meanwhile, the data deobfuscation module 350 deobfuscates the data obfuscation for anti-analysis of a part corresponding to the data among the types of the obfuscation techniques and encrypts a string given to the code, thereby, evading a string encryption technique that performs anti-analysis of an object and a resource encryption technique that performs anti-analysis of resources of a picture and xml.

Thus, the data deobfuscation module 350 decrypts the APK using the string encryption technique and the resource encryption technique to generate the deobfuscated APK execution file.

As described above, the automatic anti-analysis evasion and code logic analysis apparatus according to the embodiment of the present invention is specialized in the Android analysis, and thereby, a detailed analysis can be performed in all environments of the Dalvik virtual machine and the ART, and a user can directly create a plug-in to graft the plug-in into a device. Accordingly, the automatic anti-analysis evasion and code logic analysis apparatus has an effect that the user can easily add a necessary analysis function.

In addition, according to the embodiment of the present invention, a device is provided which allows the user to easily and efficiently analyze a malicious application through a visual output such as a control flow graph (CFG) in the Android environment, and thereby, it is possible to obtain an effect that an effort and time taken to an analysis can be reduced.

In addition, according to the embodiment of the present invention, there is an effect that a flow of an analysis target code can be extracted by using an analysis framework and a plug-in thereof, and thereby, a decryption routine of the obfuscated application can be verified and the anti-analysis technique can be evaded.

In addition, according to the embodiment of the present invention, there is an effect that the automatic anti-analysis evasion and code logic analysis apparatus is developed in a plug-in format in the Android operating system itself and can quickly cope with malicious codes targeting a new version of Android.

In addition, according to the embodiment of the present invention, there is an effect that the present invention also includes a native code and can analyze all codes executed by the Android whereas the existing Android analysis framework only aims at a byte code.

While the present invention has been described with reference to exemplary embodiments illustrated in the drawings, the embodiments are merely examples and it will be understood by those skilled in the art that various modifications and equivalent embodiments can be made from the embodiments. Accordingly, the true technical protection of the present invention should be determined by the technical idea of the appended claims.

<Description of Symbols>

| | |
|---|---|
| 100: recognition module | 110: extraction unit |
| 120: detection unit | 130: determination unit |
| 140: database | 200: instrumentation module |
| 210: Dalvik virtual machine | |
| 220: byte code instrumentation module | |
| 221: callback unit | 222: byte code extraction unit |
| 223: code conversion unit | 224: determination unit |
| 225: IR code operation unit | 226: log managing unit |
| 230: native code instrumentation module | |
| 231: native code extraction unit | 232: code conversion unit |
| 233: determination unit | 234: IR code operation unit |
| 235: log managing unit | 240: database |
| 300: deobfuscation module | 310: code parsing unit |
| 320: code unpacking unit | |
| 330: obfuscation type determination unit | |
| 340: code deobfuscation unit | |
| 350: data deobfuscation unit | |
| 360: CFG generation unit | |

What is claimed is:

1. A dynamic code extraction-based automatic anti-analysis evasion and code logic analysis apparatus comprising:
   a memory;
   one or more modules being stored in the memory, communicated and executed by a processor using an algorithm associated with a computer-readable non-transitory database, the modules comprising:
   in response to detection of an application, a recognition module configured to extract execution codes including at least one of DEX file and a SO file by unpacking an execution code of the application which being compressed in an APK form and to recognize an analysis avoidance technique by comparing a signature which is included in the extracted DEX file and SO file with data which being previously stored in the computer-readable non-transitory database;
   a instrumentation module configured to extract a code which being analyzed from a byte code configuring the DEX file and a native code configuring the SO file, to compare the extracted code which being analyzed from the byte code with the data stored in the computer-readable non-transitory database, and to output a code excluding an anti-analysis technique as a log file; and
   a deobfuscation module configured to deobfuscate an obfuscated code which is included in the APK form on the basis of the output log file and to generate an APK file in which an obfuscation technique is released on the basis of the deobfuscated code.

2. The dynamic code extraction-based automatic anti-analysis evasion and code logic analysis apparatus of claim 1,
wherein the recognition module is configured to recognize the anti-analysis technique to which at least one of an anti-rooting technique, an anti-debugging technique, and an anti-emulating technique is applied through the recognition module in the computer-readable non-transitory database.

3. The dynamic code extraction-based automatic anti-analysis evasion and code logic analysis apparatus of claim 1,
wherein the instrumentation module includes
a byte code instrumentation module configured to extract object information and execution information from the DEX file, to compare a byte code which is generated by combining the extracted object information and execution information with the computer-readable non-transitory database, and to execute a corresponding code in response to detection of the anti-analysis technique being used; and
a native code instrumentation module configured to extract an analysis target code from the SO file, to compare the extracted analysis target code with the computer-readable non-transitory database, and to execute a corresponding code in response to detection of the anti-analysis technique being used.

4. The dynamic code extraction-based automatic anti-analysis evasion and code logic analysis apparatus of claim 3,
wherein the byte code instrumentation module includes
a byte code extraction unit configured to extract a byte code by combining the object information and the execution information which being extracted from the DEX file in response to detection of an event being occurred;
a code conversion unit configured to convert the extracted byte code into an IR code or to convert the converted IR code into a byte code;
an anti-analysis technique determination unit configured to compare the converted IR code with the data which being stored in the computer-readable non-transitory database and to determine whether or not the anti-analysis technique being applied;
an IR code operation unit configured to remove the anti-analysis technique by operating a corresponding code in response to detection of the anti-analysis technique which being applied to the IR code; and
a log managing unit configured to output a code in response to detection of the code output by the log managing unit not having the anti-analysis technique as a log file.

5. The dynamic code extraction-based automatic anti-analysis evasion and code logic analysis apparatus of claim 3, wherein the native code instrumentation module includes
a native code extraction unit configured to extract a native code from the SO file when an event occurs;
a code conversion unit configured to convert the native code extracted by the native code extraction unit into an IR code;
an anti-analysis technique determination unit configured to compare the converted IR code with the data which being stored in the computer-readable non-transitory database and to determine whether or not the anti-analysis technique being applied;
an IR code operation unit that configured to remove the anti-analysis technique by operating a corresponding code in response to detection of the anti-analysis technique being applied to the converted IR code; and
a log managing unit configured to output a code in response to detection of the code output by the log managing unit not having the anti-analysis technique as a log file.

6. The dynamic code extraction-based automatic anti-analysis evasion and code logic analysis apparatus of claim 5,
wherein the native code extraction unit is configured to specify a native function to be executed by an application, and selectively to extract only a function which a user creates from the specified native function.

7. The dynamic code extraction-based automatic anti-analysis evasion and code logic analysis apparatus of claim 1,
wherein a deobfuscation module unpacking technique applied to the obfuscated code in the APK form is input on the basis of information of the log file and to generate an APK file in response to detection of a code obfuscation technique or a data obfuscation technique which being deobfuscated.

8. The dynamic code extraction-based automatic anti-analysis evasion and code logic analysis apparatus of claim 7,
wherein the deobfuscation module includes
a code deobfuscation module configured to deobfuscate a method of obfuscating a progress flow of a code; and
a data deobfuscation module configured to deobfuscate a part corresponding to data.

9. The dynamic code extraction-based automatic anti-analysis evasion and code logic analysis apparatus of claim 8,
wherein the code deobfuscation module is configured to use an API Hiding technique that hides a calling of a function and a dummy code insertion technique that transforms a calling structure by inserting a meaningless dummy code that is not actually related to an operation.

10. The dynamic code extraction-based automatic anti-analysis evasion and code logic analysis apparatus of claim 8,
wherein the data deobfuscation module is configured to use a character string encryption technique which being applied to encode a character string which is given to a code and to interfere with analysis of a function and an object which are associated with a corresponding character string, and a resource encryption technique which being applied to interfere with analysis of a pictures and a resource of xml.

11. The dynamic code extraction-based automatic anti-analysis evasion and code logic analysis apparatus of claim 8,
wherein the code deobfuscation module is configured to generate a diagram of an execution flow flowchart of functions that are given from an APK which is deobfuscated or an APK which is not deobfuscated and provides the diagram to a control flow graph (CFG).

* * * * *